US012271900B2

(12) United States Patent
Girish et al.

(10) Patent No.: US 12,271,900 B2
(45) Date of Patent: Apr. 8, 2025

(54) EXPEDITED E-COMMERCE TOKENIZATION

(71) Applicant: VISA INTERNATIONAL SERVICE ASSOCIATION, San Francisco, CA (US)

(72) Inventors: Aparna Krishnan Girish, Foster City, CA (US); Parveen Bansal, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 107 days.

(21) Appl. No.: 17/900,536

(22) Filed: Aug. 31, 2022

(65) Prior Publication Data

US 2023/0052004 A1 Feb. 16, 2023

Related U.S. Application Data

(63) Continuation of application No. 15/484,914, filed on Apr. 11, 2017, now Pat. No. 11,449,863.

(60) Provisional application No. 62/321,094, filed on Apr. 11, 2016.

(51) Int. Cl.
| | | |
|---|---|---|
| G06Q 20/40 | (2012.01) | |
| G06Q 20/10 | (2012.01) | |
| G06Q 20/12 | (2012.01) | |
| G06Q 20/32 | (2012.01) | |
| G06Q 20/36 | (2012.01) | |
| G06Q 20/38 | (2012.01) | |
| G06Q 20/42 | (2012.01) | |
| G06Q 30/0601 | (2023.01) | |

(52) U.S. Cl.
CPC ......... *G06Q 20/401* (2013.01); *G06Q 20/102* (2013.01); *G06Q 20/12* (2013.01); *G06Q 20/3276* (2013.01); *G06Q 20/3674* (2013.01); *G06Q 20/385* (2013.01); *G06Q 20/405* (2013.01); *G06Q 20/42* (2013.01); *G06Q 30/0601* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 2002/0071426 A1* | 6/2002 | Karamchedu | H04L 12/14 370/352 |
| 2004/0218588 A1* | 11/2004 | Karamchedu | H04M 15/08 370/352 |
| 2008/0091617 A1 | 4/2008 | Hazel | |
| 2011/0191177 A1 | 8/2011 | Blackhurst | |
| 2013/0198598 A1 | 8/2013 | Kirsch | |

(Continued)

OTHER PUBLICATIONS

Office Action (Notice of Allowance and Fees Due (PTOL-85)) dated May 17, 2022 for U.S. Appl. No. 15/484,914 (pp. 1-9).

(Continued)

*Primary Examiner* — Jamie R Kucab
(74) *Attorney, Agent, or Firm* — K&L Gates LLP

(57) ABSTRACT

Expedited E-Commerce Tokenization alleviates the above mentioned concerns associated with cards for merchants as well as PSPs using tokens by establishing E-Commerce browser standards around tokenization for merchants and PSPs through a standard manner of requesting customer data in an encrypted manner following a standard.

20 Claims, 3 Drawing Sheets

(56) References Cited

U.S. PATENT DOCUMENTS

| | | | |
|---|---|---|---|
| 2013/0254115 A1 | 9/2013 | Pasa | |
| 2014/0006194 A1 | 1/2014 | Xiangzhen | |
| 2014/0365363 A1* | 12/2014 | Knudsen | G06Q 20/3674 705/41 |
| 2016/0071094 A1 | 3/2016 | Krishnaiah | |
| 2016/0217459 A1* | 7/2016 | Lindner | G06Q 20/367 |
| 2016/0239840 A1* | 8/2016 | Preibisch | G06Q 20/3829 |
| 2016/0350746 A1 | 12/2016 | Johnson | |
| 2017/0061428 A1 | 3/2017 | Prabhu | |
| 2017/0070484 A1 | 3/2017 | Kruse | |
| 2017/0148013 A1 | 5/2017 | Rajurkar | |
| 2017/0193499 A1* | 7/2017 | Kusnanto | H04L 63/18 |
| 2017/0293914 A1 | 10/2017 | Girish | |
| 2018/0144339 A1 | 5/2018 | Beidas | |
| 2018/0341937 A1 | 11/2018 | Kim | |
| 2021/0019755 A1 | 1/2021 | Omojola | |

OTHER PUBLICATIONS

Office Action dated Apr. 16, 2020 for U.S. Appl. No. 15/360,357 (pp. 1-21).
Office Action dated Aug. 20, 2019 for U.S. Appl. No. 15/360,357 (pp. 1-16).
Office Action dated Aug. 3, 2021 for U.S. Appl. No. 15/360,357 (pp. 1-29).
Office Action dated Feb. 10, 2021 for U.S. Appl. No. 15/484,914 (pp. 1-14).
Office Action dated Feb. 26, 2021 for U.S. Appl. No. 15/360,357 (pp. 1-28).
Office Action dated Jan. 17, 2020 for U.S. Appl. No. 15/484,914 (pp. 1-14).
Office Action dated Jun. 1, 2021 for U.S. Appl. No. 15/484,914 (pp. 1-14).
Office Action dated Jun. 20, 2019 for U.S. Appl. No. 15/484,914 (pp. 1-16).
Office Action dated Mar. 6, 2019 for U.S. Appl. No. 15/360,357 (pp. 1-36).
Office Action dated Sep. 30, 2020 for U.S. Appl. No. 15/360,357 (pp. 1-26).

* cited by examiner

EXPEDITED E-COMMERCE TOKENIZATION

CROSS-REFERENCE TO RELATED APPLICATIONS

This is a continuation of U.S. Pat. No. 11,449,863, filed on Apr. 11, 2017; which claims priority to U.S. Provisional Patent Application Ser. No. 62/321,094, filed on Apr. 11, 2016; the disclosures of which are incorporated by reference in their entireties, herein.

BACKGROUND

When cards are used for payment purposes during checkout, E-Commerce merchants as well as payment service providers (PSPs) may traditionally allow browser auto-form fills during checkout to expedite the consumer's payment process. Merchants and PSPs then use the card information stored on file during this process. However, when a card on file has expired, the merchant/PSP has to nudge the consumer to either provide the refreshed expiry date or select another card. This practice often leads to consumer drop-offs.

When these merchants/PSPs tokenize the cards using a token service token requestor (such as Browser Partners or E-Commerce Enablers), while the benefits of tokenization are reaped, these token numbers cannot be auto-filled or key entered in the consumer browser.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

Expedited E-Commerce Tokenization alleviates the above mentioned concerns associated with cards for merchants as well as PSPs using tokens by:

Establishing E-Commerce browser standards around tokenization for merchants and PSPs;

Reducing friction during checkout thereby increasing conversion rates;

Circumvent the expired cards problem with tokenization (by requesting a valid and unique cryptogram).

Another aspect is enabling tokenization of the card used in checkout.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

SPECIFICATION

The present invention now may be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description is, therefore, not to be taken in a limiting sense.

Payment services may be designed to make payments easier and smoother. In one aspect, payment services may receive one or more payment devices such as credit cards or payment accounts. The account data such as account number, account name, billing address, shipping address, etc., may only need to be entered once and the payment service will securely store the account data using an account name. In use, a user may only need to have a payment system log-on and password to make a payment using any of the various accounts that the user has added to the payment system. In operation, the payment system may not communicate an actual account number to a merchant but may communicate a short term account number in a token for that specific transaction with the payment service may translate into the actual account number on the backend.

Figure 1:
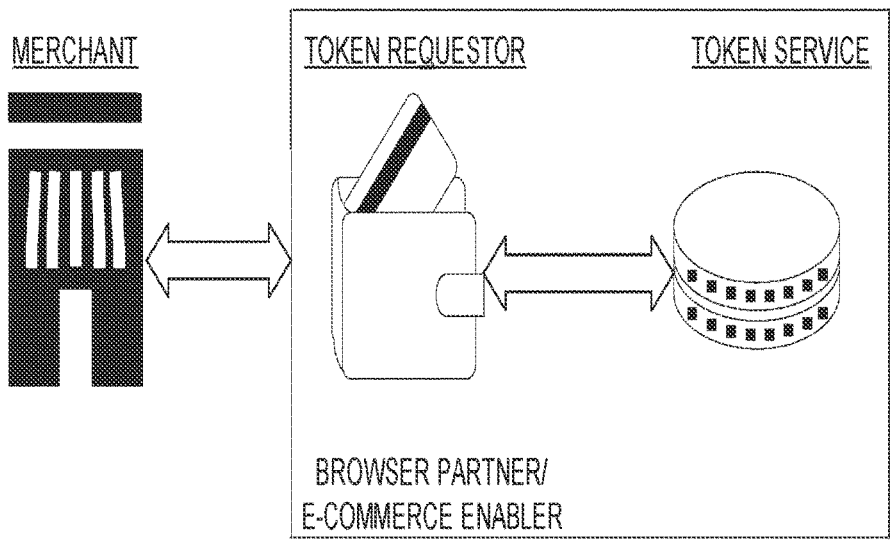
FIG. 1 illustrates a system including a merchant, a token requestor and a token service.

As illustrated in FIG. 1, Token Requestors (Browser Partners or E-Commerce Enablers) may be integrated with a token service such as Visa Token Service (VTS). Merchants may integrate with the Token Requestor to receive token data (FIG. 1). Tokens may be used by merchants and payment service providers to enable electronic payments.

Figure 2:
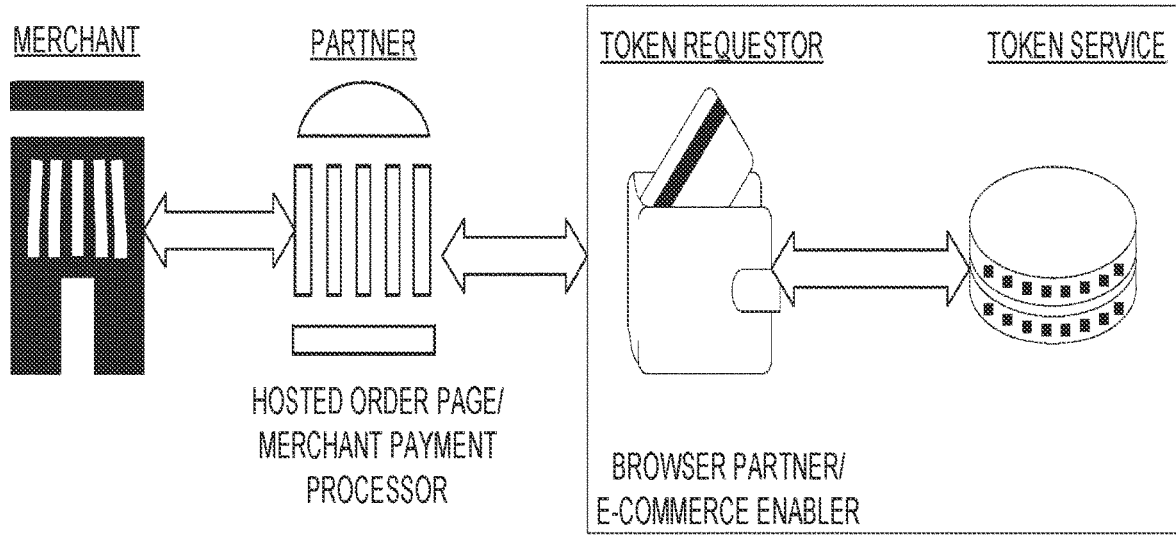
FIG. 2 illustrates a system including a merchant payment processor, a token requestor and a token service.

FIG. 2 may illustrate that Merchants or Merchant Partners or Payment Service Providers (PSPs) may be integrated with the Token Requestor to receive token data. They may not have a direct relationship with the token service. Merchants may receive token information from their partners or PSPs (partners may also be hosted order pages or payment processors of merchants), who are in turn integrated with the Token Requestor to receive token data. Merchants may have to implement some pre-requisites to make sure the electronic payment system works as desired.

Direct Merchant or E-Commerce Enabler may have to adopt the E-Commerce browser standard, and may need to make their payment page "Token Ready."

A consumer's browser may need to be compatible for the experience.

An entity requesting token payload from Token Requestor may have the authorized credentials.

A token requestor may be integrated with the token server. APIs may be needed to enroll, provision Personal Account Numbers (PANs) as well as receive cryptograms for provisioned tokens. The table below may provide an overview of the basic APIs used to explain some of the use cases.

| API Reference | Description |
| --- | --- |
| Enroll PAN | API to enroll a PAN in a token service and also retrieve card art details for a given PAN. A successful action enrolls a card with the token service for subsequent provisioning. It also retrieves the card art metadata associated with the card. |
| Provision using PAN Enrollment ID | API to provision token using PAN Enrollment ID. |
| Provision Token API using PAN | API where token requestor provides PAN data to provision a token. A successful action may provision a token from the Token Vault to a token requestor. |
| Get Payment Data API using Token | API where token requestor obtains a cryptogram for a provisioned token. |

Figure 3:
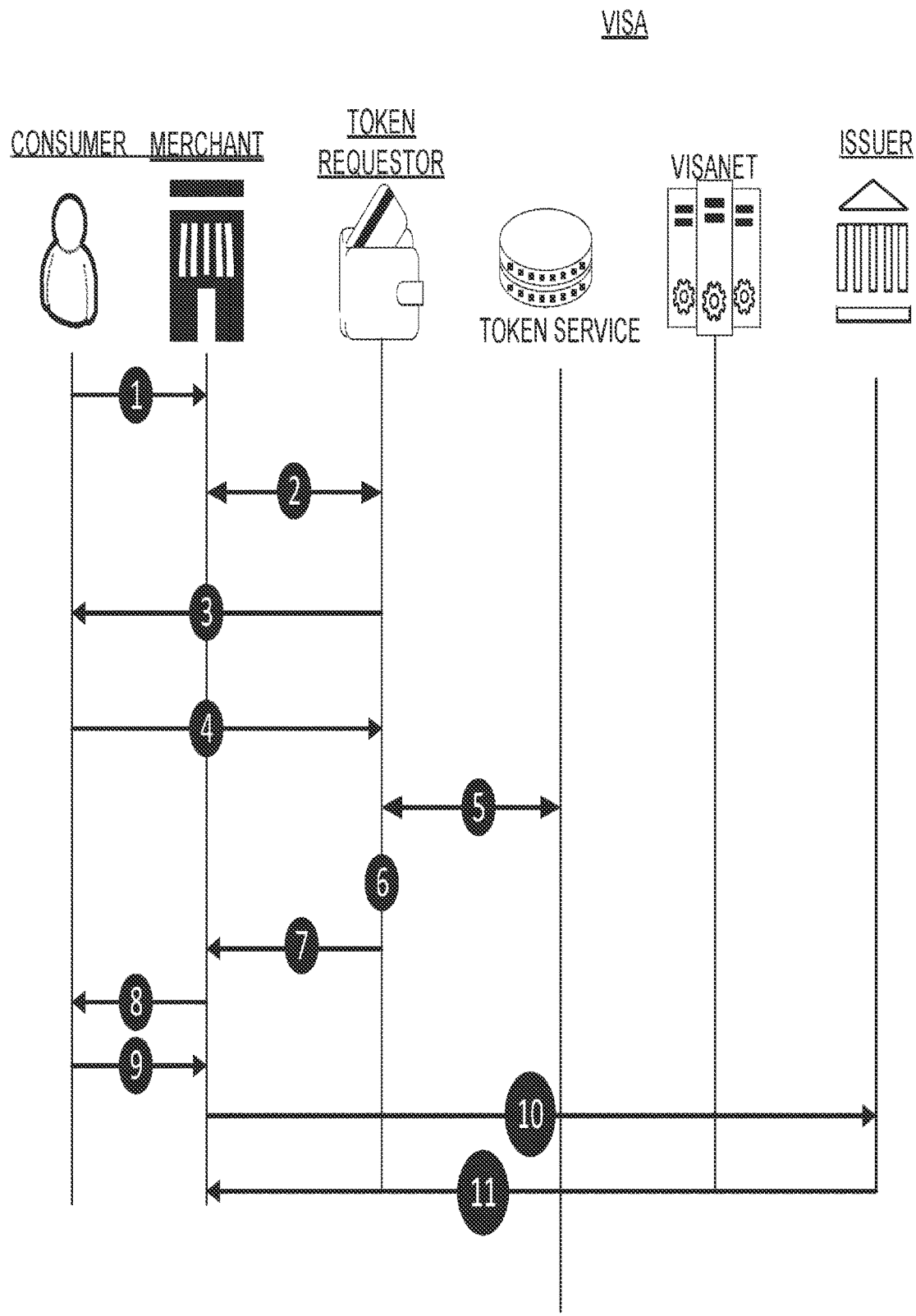
FIG. 3 illustrates an expedited e-commerce flow using token.

FIG. 3 may illustrate one embodiment of the flow of data in the system. At block 1, a consumer may shop at a merchant website and may be on the payment page initiating the checkout process such as when a consumer has selected items and is preparing to pay for the items. The shopping may be managed by a shopping server which may be local to the merchant or remote.

At block 2, a merchant's payment page may contain the following:
 "Token Ready" tag;
 "Token Client ID" tag.
The tags may be visible to the consumer or may only be available to backend servers such the payment service.

At block 3, the token requestor may
 (a) identify the page to be "Token Ready" and
 (b) validate the Token Client ID, and present the Consumer the option to select a payment device such as a credit card (existing or new card) using the payment system. Logically, if the page is not token ready or the token client ID is not validated, the customer may not be able to use a token based payment service. The token requestor may be part of the shopping server or may be a separate server which is physically configured to request tokens.

At block 4, a consumer may select a payment device such as a card on file or add a new card to the payment application. The selection may be as simple as clicking on a visual representation of one of the accounts that have been added to the payment system.

At block 5, a token requestor may receive token details from the token server for the payment device or card. If the payment device is an existing card with a provisioned token, the token requestor may requests the token server for a cryptogram and receives the cryptogram using the Get Payment Data API. The token server may be a server physically configured to handle the request and communication of tokens.

If the payment device is a new card, the token requestor may enroll and provisions the PAN first (Enroll PAN API and Provisioned Token API), and then may request cryptogram for the token (using Get Payment Data API). A user interface may be presented to the user to assist in adding the new payment device.

At block 6, the token requestor may use "Token Client ID" to encrypt the token data as well as other data elements provided in token data (see below). The encryption may be any known encryption that is appropriate and widely accepted in the payment system.

At block 7, the token requestor may push token details to the browser in the "Token Data" tag structure which is described below. As the structure is known and standard, the merchant may know what data to expect in which field. In this way, the merchant may be able to easily create a user interface that is auto filled with data from the payment system which may make payments easier for consumers and may mean more sales for merchants. For example, consumers have become accustomed to shipping addresses being auto-filled and the described system enables such auto-filling to continue using a payment service.

Further, assuming the standard is followed by other payments systems, receiving the data from a variety of systems may be simplified. For example, currently Payment System A may have a name field as the first element in a communication while Payment System B may have a name field as the fifth element in a communication. By following a standard, the Merchant will not have to have separate procedures for Payment System A and Payment System B but will simply have to follow the standard for payment system data exchange.

At block 8, the Merchant (or PSP) may obtain the token details in the "Token Data" tag, and may display appropriate card details to the consumer. In some embodiments, a user may be able to accept or reject the displayed card details.

At block 9, the consumer may review the payment device (card) information and may submit the order. For example, if the payment details are not as expected, the order may be canceled but if the payment details are as expected, the order may proceed.

The Merchant/PSP may select to display the following to the consumer:
 Payment data
 Last 4 of card
 Value added data elements as decided by the Merchant/PSP (e.g. Shipping & Billing Details).

At block 10, the merchant/PSP may map the token details to an e-commerce authorization request, and may submit through its acquiring channel for approval. The approval may be made by an approval server which may be local or remote and may be physically configured to make and communicate authorization decisions.

At block 11, the e-commerce authorization request may be approved or declined, and the corresponding authorization response may be sent back to the merchant. If the authorization is declined, a user may be permitted to submit the authorization data again.

To aid implementation, the various requirements as well as recommendations to Token Requestors, Merchants as well as PSPs in the payment experience, the following system elements are noted as follows.

"Token Ready" Tag
1. Merchant or PSP receiving the token details may need to enable an HTML tag on the payment page to mark it "Token Ready."
2. Token Requestor may need to be able to identify the payment page as being "Token Ready," and subsequently trigger the corresponding E-Commerce payment experience.

"Token Client ID" tag
1. Merchant or PSP receiving the token details may need to enable an HTML tag "Token Client ID" tag to specify its relationship with Token Requestor.
   a. Merchant may have a direct relationship with Token Requestor OR
   b. Merchant is connected to the Token Requestor via a PSP or partner (Acquirer/Gateway/E-Commerce Payment Service Provider).
2. Token Requestor may be able to validate the "Token Client ID" as well as use it to encrypt token data.

"Token Data" Tag
1. Token Requestor may need to be able to return token details (obtained from token server) required for the consumer's order confirmation, receipt as well as payment authorization in "Token Data" tag.
2. Merchant or PSP receiving token elements may need to be able to receive token data in the "Token Data" tag.
3. The value added data elements as noted in the use case above may contain more elements than the ones specified in the list below, and is dependent on their availability and data sensitivity.

It is recommended that the Token Data include some of the following unencrypted and encrypted data.

Unencrypted Data: Non-sensitive information for display purposes to the consumer (without requiring decryption)
Last 4 of Card
Additional data—as available by the Token Requestor as well as depending on data sensitivity
ZIP Code
Country
Etc.

Encrypted Data:
Payment Fields as obtained from the token server
Token Number
Token Expiration Date
Token Cryptogram (TAVV)
Last 4 of Card
ECI Indicator
Consumer Profile Fields—as available by the Token Requestor as well as depending on data sensitivity
Billing Address
Address Line 1
Address Line 2
City
State/Province
Zip/Postal Code
Shipping Address
Address Line 1
Address Line 2
City
State/Province
Zip/Postal Code
Email Address
Phone Numbers
Primary Phone Number
Alternate Phone Number Below are some procedures which may make the e-commerce tokenization procedures more expedited and efficient.

Expedited E-Commerce Tokenization Procedures

| Area | Description | Requirement/ Guideline |
|---|---|---|
| Token Provisioning | Merchants or PSPs may need to present their tokenization content in the service terms and privacy policies to the cardholder prior to provisioning a token. | Requirement |
| Consumer Interface/ Customer Service | Merchants or PSPs may include appropriate messaging to educate cardholders on tokenization. | Guideline |
| | Tokens may not be auto-filled/key-entered in the browser. | Requirement |
| | Merchants or PSPs may need to use the term "digital account number" instead of the term "token" in all their communication with the cardholder. | Requirement |
| | For consumer-receipt purposes, where the card expiration date is used today, the last four digits of the PAN without the expiration date may need to be used display purposes. | Requirement |

Data Encryption
This section describes the description of the data to be encrypted and the minimum requirements of the encryption. The encryption may apply to all the personal account identifiers sent by token requestor to their merchants or PSP.

| Area | Description | Possible Requirement |
|---|---|---|
| Data Encryption | Secure encryption of transmission and secure storage of encrypted data. An authority may recommend the use of symmetric e.g., AES-GCM, CBS, CCM or asymmetric e.g., PKI keys. The encryption keys may be securely protected. | Keysizes 128-bits or highersym; Keysizes RSA Modulus 2048-bits or higher asym. ECC keysize of 256-bits or higher. As per Industry best practices and protocols. |
| Integrity and non-repudiation of sensitive | Secure encryption of transmission and secure storage of encrypted data. An | Keysizes 128-bits or highersym; RSA Modulus 2048-bits or higher |

| Area | Description | Possible Requirement |
|---|---|---|
| data if applicable, for data in transit | authority may recommend the use of symmetric e.g., AES-GCM, CBS, CCM or asymmetric e.g., PKI keys. The encryption keys may be securely protected. | asym. ECC keysize of 256-bits or higher. As per Industry best practices and protocols. |
| Transmission | An authority may recommend two-way SSL to secure communication of personally identifiable information e.g., cardholder address as well as personal account identifiers e.g., token. | SSL/TLS secure communication, as per Industry best practices and protocols. |
| Authentication and session management | All communications may have appropriate authentication methods between applications e.g., mobile app, web redirects or between business entities e.g., client-to-server, server-to-server | UserName/Password, PIN, OAuth 2.0, SAML 2.0, etc., as per Industry best practices and protocols. |
| Access Control | Appropriate access control measures may be recommended to prevent identity attacks. | Role-based Access Control, as per Industry best practices. |

Finally, the Merchant or PSP may decrypt the encrypted information in token data to assist in auto-filing fields and presenting data to users to speed transactions and make transactions more trustworthy from a user's perspective.

As a result of the system and the unified format described herein, a merchant may be able to make a single request for a certain type of data without regard to the payment service receiving the request. Currently, each payment service has a different way to name each data field, a different API to call for certain data, a different manner of delivering the data, etc. As a result, a merchant has to add programming for each payment service that is supported along with the appropriate APIs for each payment service. By having a consistent manner of naming data, calling for data, receiving data, etc., the amount of programming may significantly drop. Further, the exchange with payment applications may be more reliable as the data exchange should follow a standard.

A more recent complexity is the use of tokens. Tokens are not actual PANs but may be used as a proxy for a PAN wherein an authority may translate the token data into a PAN but the token data is the only data disclosed on a network. By following the blocks of the above described system and method, account data which may be stored by the token server may still be accessed and used for autofill purposes to assist users in filling out forms which may be filled with autofill data. Such data was often previously unavailable to merchants when tokens were used. By addressing this technical problem of user data being hidden behind tokens, the user data may now be available to merchants in an encrypted manner.

Another benefit may be that expired cards may not limit a user from using a payment application to make a purchase. The merchant may request a valid and unique cryptogram which may be provided even if the underlying card has expired in certain circumstances. Instead of having bother users to enter data on new cards with updated expiration dates, the old card may be leveraged to allow a user to continue to use the payment application to make payments. In other embodiments, the user may only have to update an expiration data and all the other card data may be auto-filled.

Figure 4:
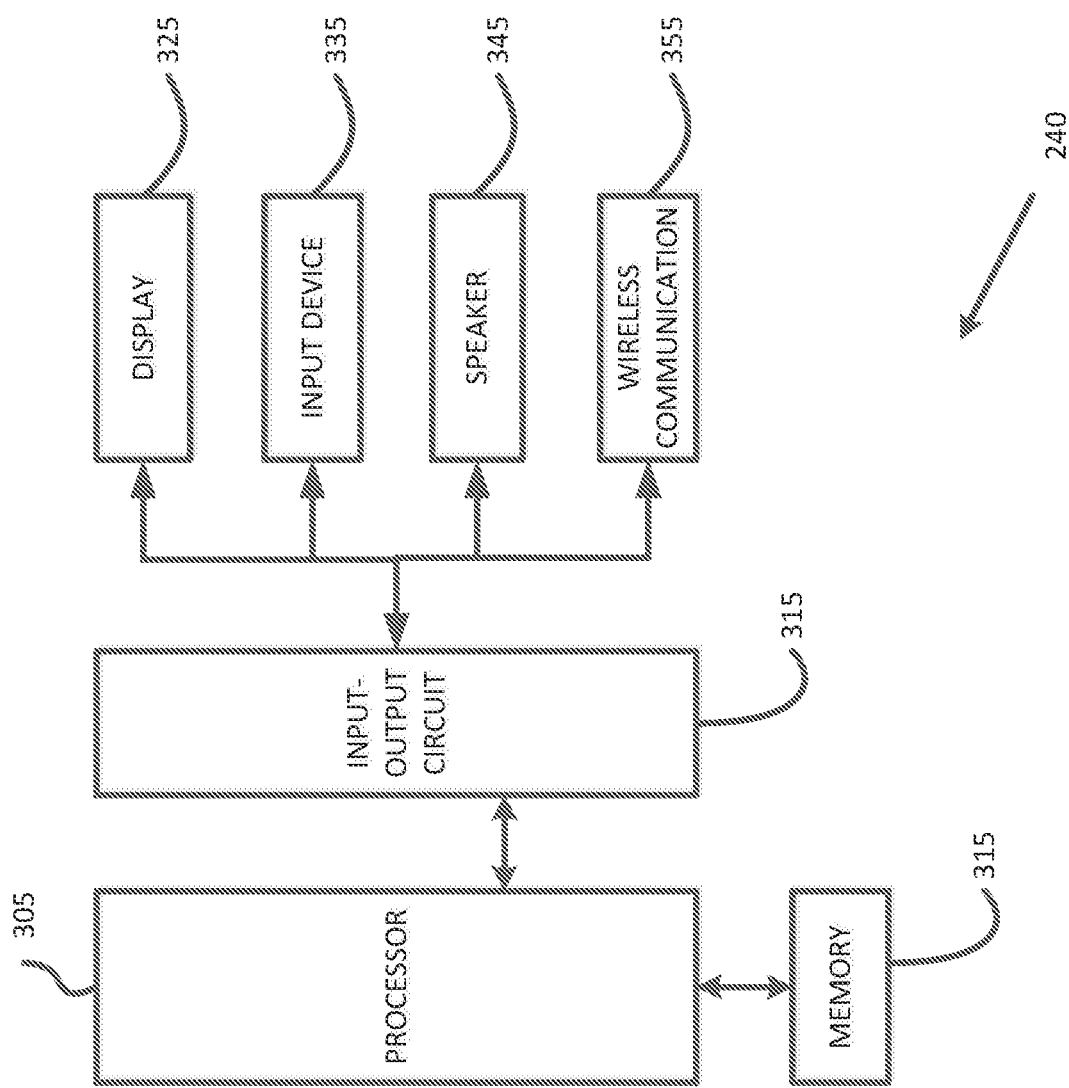
FIG. 4 illustrates a sample computing system.

FIG. 4 may illustrate the physical elements that may be used by a computing device 240. The computing device 240 may be portable and may have a processor 305 which may be physically configured according to computer executable instructions. A memory 315 may be in communication with the processor 305 and the memory may store the portable computing device ids, the verification codes and other data that may be useful to the processor 305. The processor 305 may be in communication with an input-output circuit 315 which may manage communications to and from the processor 305. The input-output circuit 315 may be in communication with a display 325 which may be touch sensitive. The input-output circuit 315 may be in communication with an input device 335 which may be a keyboard, touchpad, etc. The input-output circuit 315 may be in communication with a speaker 345 which may be used to communicate messages to the user by voice. The input-output circuit 315 may be in communication with a wireless communication circuit which may be used to communicate wirelessly in a variety of forms such as via Bluetooth, WiFi, cellular, or any other appropriate RF communication form and format.

The user devices, computers and servers described herein may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving payment systems. Further advantages and modifications of the above described system and method will readily occur to those skilled in the art. The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A computerized method of securely communicating data for payment systems, comprising:
   identifying, via an instruction on a purchase payment page of a merchant, a secure checkout process, said purchase payment page being presented to a user;
   providing, by a token requestor via the instruction, an option to select a payment device on the purchase payment page of the merchant;
   receiving, by the token requestor, a selection of the payment device from the user on the purchase payment page of the merchant;
   in response to the selection of the payment device from the user on the purchase payment page of the merchant, encrypting, by the token requestor, data of the payment device;
   creating, by the token requestor, a token payload storing at least the encrypted data of the payment device in a plurality of data fields;
   receiving a request from the merchant for the token payload; and
   providing, by the token requestor, the token payload to the purchase payment page of the merchant to complete a payment by the user.

2. The computerized method of claim 1, further comprising enabling the instruction to be visible to the user on the purchase payment page.

3. The computerized method of claim 1, wherein the request comprises a request for data of a valid payment device.

4. The computerized method of claim 1, wherein the encrypted data in the token payload comprises a proxy of a personal account number associated with the payment device.

5. The computerized method of claim 1, wherein the plurality of data fields comprises a token data tag storing token data.

6. The computerized method of claim 5, wherein the token data in the token data tag comprises encrypted data and unencrypted data.

7. The computerized method of claim 5, further comprising exposing a portion of the token data to the user on the purchase payment page.

8. The computerized method of claim 5, wherein the token data comprises a proxy of a personal account number associated with the payment device.

9. The computerized method of claim 6, further comprising selectively exposing the unencrypted data to the user on another graphical user interface.

10. The computerized method of claim 9, wherein selectively exposing comprises exposing one or more of the encrypted data and the unencrypted data as autofill data on a form.

11. A token-based payment service platform for processing payment requests from a merchant comprising a server configured to:
    receive a secure checkout process request via a purchase payment page of a merchant, said purchase payment page being presented to a user;
    provide an option to select a payment device on the purchase payment page of the merchant;
    receive a selection of the payment device from the user on the purchase payment page of the merchant;
    in response to the selection of the payment device from the user on the purchase payment page of the merchant, encrypt data of the payment device;
    create a token payload storing at least the encrypted data of the payment device in a plurality of data fields;
    receive a request from the merchant for the token payload; and
    provide the token payload to the purchase payment page of the merchant to complete a payment by the user.

12. The token-based payment service platform of claim 11, wherein the server is further configured to enable the secure checkout process request to be visible to the user on the purchase payment page.

13. The token-based payment service platform of claim 11, wherein the request comprises a request for data of a valid payment device.

14. The token-based payment service platform of claim 11, wherein the encrypted data in the token payload comprises a proxy of a personal account number associated with the payment device.

15. The token-based payment service platform of claim 11, wherein the server is further configured to expose a portion of the encrypted data as autofill data on the purchase payment page.

16. A non-transitory computer-readable medium comprising computer-executable instructions for securely communicating data for payment systems, the computer-executable instructions comprising:
    identifying, via an instruction on a purchase payment page of a merchant, a secure checkout process, said purchase payment page being presented to a user;
    providing, by a token requestor via the instruction, an option to select a payment device on the purchase payment page of the merchant;
    receiving, by the token requestor, a selection of the payment device from the user on the purchase payment page of the merchant;
    in response to the selection of the payment device from the user on the purchase payment page of the merchant, encrypting, by the token requestor, data on the payment device;
    creating, by the token requestor, a token payload storing at least the encrypted data of the payment device in a plurality of data fields;
    receiving a request from the merchant for the token payload; and
    providing, by the token requestor, the token payload to the purchase payment page of the merchant to complete a payment by the user.

17. The non-transitory computer-readable medium of claim 16, further comprising instructions for enabling the instruction to be visible to the user on the purchase payment page.

18. The non-transitory computer-readable medium of claim 16, wherein the request comprises a request for data of a valid payment device.

19. The non-transitory computer-readable medium of claim 16, wherein the encrypted data in the token payload comprises a proxy of a personal account number associated with the payment device.

20. The non-transitory computer-readable medium of claim 16, further comprising instruction for exposing a portion of the encrypted data as autofill data on the purchase payment page.

* * * * *